(12) United States Patent
Wang

(10) Patent No.: US 12,068,821 B2
(45) Date of Patent: Aug. 20, 2024

(54) CSI CALCULATION METHOD, USER TERMINAL AND COMPUTER-READABLE STORAGE MEDIUM

(71) Applicant: BEIJING UNISOC COMMUNICATIONS TECHNOLOGY CO., LTD., Beijing (CN)

(72) Inventor: Hualei Wang, Shanghai (CN)

(73) Assignee: BEIJING UNISOC COMMUNICATIONS TECHNOLOGY CO., LTD., Beijing (CN)

( * ) Notice: Subject to any disclaimer, the term of this patent is extended or adjusted under 35 U.S.C. 154(b) by 397 days.

(21) Appl. No.: 17/280,582

(22) PCT Filed: Aug. 9, 2019

(86) PCT No.: PCT/CN2019/099938
§ 371 (c)(1),
(2) Date: Mar. 26, 2021

(87) PCT Pub. No.: WO2020/063137
PCT Pub. Date: Apr. 2, 2020

(65) Prior Publication Data
US 2022/0038154 A1    Feb. 3, 2022

(30) Foreign Application Priority Data

Sep. 28, 2018    (CN) .......................... 201811140183.1

(51) Int. Cl.
*H04B 7/06*    (2006.01)
*H04W 72/23*    (2023.01)
(Continued)

(52) U.S. Cl.
CPC ........... *H04B 7/0626* (2013.01); *H04B 7/063* (2013.01); *H04W 72/23* (2023.01);
(Continued)

(58) Field of Classification Search
CPC ...... H04B 7/0626; H04B 7/063; H04B 7/024; H04B 7/0632; H04B 7/0639;
(Continued)

(56) References Cited

U.S. PATENT DOCUMENTS

2013/0301548 A1    11/2013    Etemad et al.
2016/0365990 A1    12/2016    Yum et al.
(Continued)

FOREIGN PATENT DOCUMENTS

CN    102291212 A    12/2011
CN    107370559 A    11/2017
(Continued)

OTHER PUBLICATIONS

ZTE CORP. et al. "Consideration on CSI Measurement and Feedback for NR MIMO" 3GPP TSG RAN WG1 Meeting #85 R1-164297, May 27, 2016 (May 27, 2016), entire document.
(Continued)

*Primary Examiner* — Ayanah S George
(74) *Attorney, Agent, or Firm* — Harness, Dickey & Pierce, P.L.C.

(57) ABSTRACT

A CSI calculation method, a user terminal and a computer-readable storage medium, the method comprising: receiving network configuration information issued by a network side; determining a CSI calculation behavior according to the network configuration information; and when the CSI calculation behavior is carrying out CSI calculation on the basis of non-coherent joint transmission, calculating CSI corresponding to each codeword, wherein when CSI corresponding to a first codeword is calculated, measurement and
(Continued)

calculation results of resources corresponding to the other codewords are taken as inter-codeword interference corresponding to the first codeword. The above-mentioned solution can realize CSI calculation of a non-coherent joint transmission scheme.

16 Claims, 1 Drawing Sheet

(51) Int. Cl.
*H04W 72/541* (2023.01)
*H04W 72/542* (2023.01)
*H04W 72/563* (2023.01)

(52) U.S. Cl.
CPC ....... *H04W 72/541* (2023.01); *H04W 72/542* (2023.01); *H04W 72/563* (2023.01)

(58) Field of Classification Search
CPC . H04W 72/23; H04W 72/541; H04W 72/542; H04W 72/563; H04W 24/10; H04L 25/0224; H04L 5/0057; H04L 5/0035
See application file for complete search history.

(56) References Cited

U.S. PATENT DOCUMENTS

| | | | |
|---|---|---|---|
| 2018/0042028 A1 | 2/2018 | Nam et al. | |
| 2018/0049236 A1 | 2/2018 | Sun et al. | |
| 2020/0244320 A1* | 7/2020 | Wang | H04B 7/0626 |

FOREIGN PATENT DOCUMENTS

| | | | |
|---|---|---|---|
| CN | 108039903 A | | 5/2018 |
| EP | 2826276 A1 | | 1/2015 |
| EP | 3457603 A1 | | 3/2019 |
| EP | 3678403 A1 | | 7/2020 |
| JP | 2015521428 A | | 7/2015 |
| KR | 10-2016-0093533 A | | 8/2016 |
| WO | WO-2018107029 A1 | * | 6/2018 |

OTHER PUBLICATIONS

International Search Report (in English and Chinese) and Written Opinion of the International Searching Authority (in Chinese) issued in PCT/CN2019/099938, mailed Sep. 26, 2019; ISA/CN.
Ericsson. "CSI feedback for multiple-TRP." R1-1720974, 3GPP TSG RAN WG1 Meeting. vol. 91, Dec. 1, 2017.
Extended European Search Report regarding Application No. 19865776.9 dated Jun. 1, 2022.
Huawei, HiSilicon. "CSI measurement and reporting for coordinated transmission scheme." R1-1701679, 3GPP TSG RAN WG1 Meeting. vol. 88, Feb. 13, 2017.
Huawei, HiSilicon. "Discussion on enhancements for non-coherent JT." R1-1703063, 3GPP TSG RAN WG1 Meeting. vol. 88, Feb. 13, 2017.
Huawei, HiSilicon. "Enhancements on multi-TRP/panel transmission in NR." R1-1809117, 3GPP TSG RAN WG1 Meeting. vol. 94, Aug. 20, 2018.
Huawei, HiSilicon. "Enhancements on multi-TRP/panel transmission." R1-1812243, 3GPP TSG RAN WG1 Meeting. vol. 94, Aug. 20, 2018.
Japanese Office Action regarding Application No. 2021-517812, dated Jun. 27, 2022.
Korean Office Action regarding Application No. 10-2021-7012744, dated Jul. 29, 2022.
ZTE Microelectronics. "Enhancements for non-coherent JT." R1-1701839, 3GPP TSG RAN WG1 Meeting. vol. 88, Feb. 13, 2017.
Ericsson. "On CSI measurement." R1-1718431, 3GPP TSG-RAN WG1 #90bis, Oct. 13, 2017.

* cited by examiner

CSI CALCULATION METHOD, USER TERMINAL AND COMPUTER-READABLE STORAGE MEDIUM

CROSS-REFERENCE TO RELATED APPLICATIONS

This application is the national phase of International Application No. PCT/CN2019/099938, filed on Aug. 9, 2019, which claims the benefit of priority to Chinese Patent Application No. 201811140183.1, filed on Sep. 28, 2018, and entitled "CSI CALCULATION METHOD, USER TERMINAL AND COMPUTER READABLE STORAGE MEDIUM". The entire disclosures of the above applications are expressly incorporated by reference herein.

TECHNICAL FIELD

The present disclosure generally relates to radio communication field, and more particularly, to a Channel State Information (CSI) calculation method, a user terminal and a computer readable storage medium.

BACKGROUND

A Channel State Information (CSI) protocol framework has been clarified in New Radio (NR) R15. Specifically, a user terminal learns report content that needs to be measured based on CSI-ReportConfig information configured on a network side so as to further learn which transmission solution CSI calculation is based on, and performs the CSI calculation based on CSI-ResourceConfig associated with the CSI-ReportConfig information.

In the existing NR CSI protocol framework, an NR protocol merely supports closed-loop transmission solutions and open-loop/semi-open-loop transmission solutions, but does not involve in non-coherent joint transmission solutions.

SUMMARY

In embodiments of the present disclosure, a CSI calculation method is provided for non-coherent joint transmission solutions.

In an embodiment of the present disclosure, a CSI calculation method is provided, including: receiving network configuration information from a network side; determining a CSI calculation behavior based on the network configuration information; and if the CSI calculation behavior is to perform CSI calculation based on non-coherent joint transmission, calculating CSI corresponding to each codeword, wherein when calculating the CSI corresponding to a first codeword, a measurement calculation result of resources corresponding to other codewords is taken as inter-codeword interference corresponding to the first codeword.

Optionally, determining the CSI calculation behavior based on the network configuration information includes any one of the following: acquiring CSI report configuration information based on the network configuration information, and determining the CSI calculation behavior based on the CSI report configuration information; or, acquiring CSI resource configuration information for channel measurement based on the network configuration information, and determining the CSI calculation behavior based on the CSI resource configuration information for channel measurement; or, acquiring indication information for indicating the CSI calculation behavior based on the network configuration information, and determining the CSI calculation behavior based on the indication information for indicating the CSI calculation behavior.

Optionally, acquiring the CSI report configuration information based on the network configuration information includes any one of the following: acquiring the CSI report configuration information from the network configuration information; or acquiring information indicated by downlink control information from the network configuration information, wherein the information indicated by the downlink control information includes a CSI aperiodic trigger state triggered to be selected by a CSI request; and acquiring the CSI report configuration information associated with the CSI aperiodic trigger state.

Optionally, determining the CSI calculation behavior based on the CSI report configuration information includes: acquiring rank information from the CSI report configuration information, wherein the rank information indicates a number of ranks included in a CSI report, or a maximum number of ranks included in the CSI report; and if the rank information indicates that the number of ranks included in the CSI report is 2, or indicates that the maximum number of ranks included in the CSI report is 2, determining that the CSI calculation behavior is to perform CSI calculation based on non-coherent joint transmission.

Optionally, if a resource set includes a plurality of NZP CSI-RS resources, calculating the CSI corresponding to the first codeword includes: taking a measurement and calculation result of NZP CSI-RS resources corresponding to other codewords as the inter-codeword interference corresponding to the first codeword, and calculating the CSI corresponding to the first codeword based on the inter-codeword interference corresponding to the first codeword; or if the resource set includes one NZP CSI-RS resource which includes port groups with different Quasi Co-Location (QCL) information, calculating the CSI corresponding to the first codeword includes: taking a measurement and calculation result of port groups corresponding to other codewords as the inter-codeword interference corresponding to the first codeword, and calculating the CSI corresponding to the first codeword based on the inter-codeword interference corresponding to the first codeword.

Optionally, acquiring CSI resource configuration information for channel measurement based on the network configuration information includes any one of the following: acquiring the CSI resource configuration information for channel measurement from the network configuration information; or acquiring information indicated by downlink control information from the network configuration information, wherein the information indicated by the downlink control information includes a CSI aperiodic trigger state triggered to be selected by a CSI request; and acquiring the CSI resource configuration information for channel measurement associated with the CSI aperiodic trigger state.

Optionally, determining the CSI calculation behavior based on the CSI resource configuration information for channel measurement includes: if it is learned that in the CSI resource configuration information for channel measurement, one resource set includes at least two NZP CSI-RS resources, determining that the CSI calculation behavior is to perform CSI calculation based on non-coherent joint transmission.

Optionally, calculating the CSI corresponding to the first codeword includes: taking a measurement and calculation result of NZP CSI-RS resources corresponding to other codewords as the inter-codeword interference corresponding to the first codeword, and calculating the CSI corresponding to the first codeword based on the inter-codeword interference corresponding to the first codeword.

Optionally, determining the CSI calculation behavior based on the CSI resource configuration information for channel measurement includes: if it is learned that in the CSI resource configuration information for channel measurement, one NZP CSI-RS resource has at least two port groups which correspond to different QCL information, determining that the CSI calculation behavior is to perform CSI calculation based on non-coherent joint transmission.

Optionally, calculating the CSI corresponding to the first codeword includes: taking a measurement and calculation result of port groups corresponding to other codewords as the inter-codeword interference corresponding to the first codeword, and calculating the CSI corresponding to the first codeword based on the inter-codeword interference corresponding to the first codeword.

Optionally, acquiring indication information for indicating the CSI calculation behavior based on the network configuration information includes: acquiring information indicated by downlink control information from the network configuration information; and acquiring the indication information for indicating the CSI calculation behavior which is included in a CSI aperiodic trigger state based on the information indicated by the downlink control information.

Optionally, the indication information for indicating the CSI calculation behavior is rank joint information, and the rank joint information means that different rank values reported satisfy a candidate rank pair.

Optionally, calculating the CSI corresponding to the first codeword includes: taking a measurement and calculation result corresponding to other codewords in the same CSI aperiodic trigger state as the inter-codeword interference corresponding to the first codeword, and calculating the CSI corresponding to the first codeword based on the inter-codeword interference corresponding to the first codeword, wherein the measurement and calculation result corresponding to other codewords includes a measurement and calculation result of NZP CSI-RS resources in a resource set for channel measurement in configuration information associated with the other codewords.

Optionally, when the network configuration information includes information indicated by a plurality of downlink control information, values corresponding to CSI requests in the plurality of downlink control information are equal.

Optionally, after calculating the CSI corresponding to each codeword, the method further includes: reporting the CSI corresponding to each codeword to the network side.

Optionally, reporting the CSI corresponding to each codeword to the network side includes: reporting the CSI corresponding to each codeword and validity indication information corresponding to each CSI to the network side.

Optionally, the validity indication information has a length of 1 bit or 2 bits.

Optionally, when it is detected that the validity indication information corresponding to the CSI corresponding to a second codeword indicates invalid, in the calculation of the CSI corresponding to the first codeword, a measurement and calculation result corresponding to the second codeword is not taken as the inter-codeword interference corresponding to the first codeword.

Optionally, the CSI corresponding to each codeword is reported to the network side in any of the following ways: reporting a CSI report to the network side, wherein the CSI report carries the CSI corresponding to each codeword; or reporting a plurality of CSI reports to the network side, wherein each of the plurality of CSI reports carries CSI corresponding to one codeword.

Optionally, when each of the plurality of CSI reports carries the CSI corresponding to one codeword, a priority of the CSI report corresponding to each codeword is the same, and a priority of any even subband CSI in the CSI report corresponding to each codeword is higher than a priority of any odd subband CSI in the CSI reports corresponding to all codewords.

Optionally, when the CSI corresponding to the first codeword is the same as CSI corresponding to a second codeword, and the CSI corresponding to the first codeword includes at least one of CRI, RI, PMI or CQI, in calculation of the CSI corresponding to the first codeword, a measurement and calculation result corresponding to the second codeword is not taken as the inter-codeword interference corresponding to the first codeword.

Optionally, when it is detected that RI of CSI corresponding to a second codeword is greater than 4, in calculation of the CSI corresponding to the first codeword, a measurement and calculation result corresponding to the second codeword is not taken as the inter-codeword interference corresponding to the first codeword.

In an embodiment of the present disclosure, a user terminal is provided, including: a receiving circuitry configured to receive network configuration information from a network side; a determining circuitry configured to determine a CSI calculation behavior based on the network configuration information; and a calculating circuitry configured to: if the CSI calculation behavior is to perform CSI calculation based on non-coherent joint transmission, calculate CSI corresponding to each codeword, wherein when calculating the CSI corresponding to a first codeword, a measurement calculation result of resources corresponding to other codewords is taken as inter-codeword interference corresponding to the first codeword.

Optionally, the determining circuitry is configured to determine the CSI calculation behavior based on the network configuration information in any one of the following ways: acquiring CSI report configuration information based on the network configuration information, and determining the CSI calculation behavior based on the CSI report configuration information; or, acquiring CSI resource configuration information for channel measurement based on the network configuration information, and determining the CSI calculation behavior based on the CSI resource configuration information for channel measurement; or, acquiring indication information for indicating the CSI calculation behavior based on the network configuration information, and determining the CSI calculation behavior based on the indication information for indicating the CSI calculation behavior.

Optionally, the determining circuitry is configured to acquire the CSI report configuration information based on the network configuration information in any one of the following ways: acquiring the CSI report configuration information from the network configuration information; or acquiring information indicated by downlink control information from the network configuration information, wherein the information indicated by the downlink control information includes a CSI aperiodic trigger state triggered to be selected by a CSI request; and acquiring the CSI report configuration information associated with the CSI aperiodic trigger state.

Optionally, the determining circuitry is configured to: acquire rank information from the CSI report configuration information, wherein the rank information indicates a number of ranks included in a CSI report, or a maximum number of ranks included in the CSI report; and if the rank information indicates that the number of ranks included in the CSI report is 2, or indicates that the maximum number of ranks included in the CSI report is 2, determine that the CSI calculation behavior is to perform CSI calculation based on non-coherent joint transmission.

Optionally, the calculating circuitry is configured to: if a resource set includes a plurality of NZP CSI-RS resources, take a measurement and calculation result of NZP CSI-RS resources corresponding to other codewords as the inter-codeword interference corresponding to the first codeword, and calculate the CSI corresponding to the first codeword based on the inter-codeword interference corresponding to the first codeword; or if the resource set includes one NZP CSI-RS resource which includes port groups with different QCL information, take a measurement and calculation result of port groups corresponding to other codewords as the inter-codeword interference corresponding to the first codeword, and calculate the CSI corresponding to the first codeword based on the inter-codeword interference corresponding to the first codeword.

Optionally, the determining circuitry is configured to acquire CSI resource configuration information for channel measurement based on the network configuration information in any one of the following ways: acquiring the CSI resource configuration information for channel measurement from the network configuration information; or acquiring information indicated by downlink control information from the network configuration information, wherein the information indicated by the downlink control information includes a CSI aperiodic trigger state triggered to be selected by a CSI request; and acquiring the CSI resource configuration information for channel measurement associated with the CSI aperiodic trigger state.

Optionally, the determining circuitry is configured to: if it is learned that in the CSI resource configuration information for channel measurement, one resource set includes at least two NZP CSI-RS resources, determine that the CSI calculation behavior is to perform CSI calculation based on non-coherent joint transmission.

Optionally, the calculating circuitry is configured to: take a measurement and calculation result of NZP CSI-RS resources corresponding to other codewords as the inter-codeword interference corresponding to the first codeword, and calculate the CSI corresponding to the first codeword based on the inter-codeword interference corresponding to the first codeword.

Optionally, the determining circuitry is configured to: if it is learned that in the CSI resource configuration information for channel measurement, one NZP CSI-RS resource has at least two port groups which correspond to different QCL information, determine that the CSI calculation behavior is to perform CSI calculation based on non-coherent joint transmission.

Optionally, the calculating circuitry is configured to: take a measurement and calculation result of port groups corresponding to other codewords as the inter-codeword interference corresponding to the first codeword, and calculate the CSI corresponding to the first codeword based on the inter-codeword interference corresponding to the first codeword.

Optionally, the determining circuitry is configured to: acquire information indicated by downlink control information from the network configuration information; and acquire the indication information for indicating the CSI calculation behavior which is included in a CSI aperiodic trigger state based on the information indicated by the downlink control information.

Optionally, the indication information for indicating the CSI calculation behavior is rank joint information, and the rank joint information means that different rank values reported satisfy a candidate rank pair.

Optionally, the calculating circuitry is configured to: take a measurement and calculation result corresponding to other codewords in the same CSI aperiodic trigger state as the inter-codeword interference corresponding to the first codeword, and calculate the CSI corresponding to the first codeword based on the inter-codeword interference corresponding to the first codeword, wherein the measurement and calculation result corresponding to other codewords includes a measurement and calculation result of NZP CSI-RS resources in a resource set for channel measurement in configuration information associated with the other codewords.

Optionally, when the network configuration information includes information indicated by a plurality of downlink control information, values corresponding to CSI requests in the plurality of downlink control information are equal.

Optionally, the user terminal further includes a reporting circuitry configured to: after the calculating circuitry calculates the CSI corresponding to each codeword, report the CSI corresponding to each codeword to the network side.

Optionally, the reporting circuitry is configured to report the CSI corresponding to each codeword and validity indication information corresponding to each CSI to the network side.

Optionally, the validity indication information has a length of 1 bit or 2 bits.

Optionally, the reporting circuitry is configured to report the CSI corresponding to each codeword to the network side in any of the following ways: reporting a CSI report to the network side, wherein the CSI report carries the CSI corresponding to each codeword; or reporting a plurality of CSI reports to the network side, wherein each of the plurality of CSI reports carries CSI corresponding to one codeword.

Optionally, when each of the plurality of CSI reports carries the CSI corresponding to one codeword, a priority of the CSI report corresponding to each codeword is the same, and a priority of any even subband CSI in the CSI report corresponding to each codeword is higher than a priority of any odd subband CSI in the CSI reports corresponding to all codewords.

In an embodiment of the present disclosure, a nonvalatile or nontransitory computer readable storage medium having computer instructions stored therein is provided, wherein when the computer instructions are executed, any one of the above methods is performed.

In an embodiment of the present disclosure, a user terminal including a memory and a processor is provided, wherein the memory has computer instructions stored therein, and when the processor executes the computer instructions, any one of the above methods is performed.

Embodiments of the present disclosure may provide following advantages.

In embodiments of the present disclosure, if the CSI calculation behavior is determined, based on the network configuration information received from the network side, to be performing CSI calculation based on non-coherent joint transmission, during the calculation of the CSI corresponding to the first codeword, a measurement calculation result of resources corresponding to other codewords is taken as inter-codeword interference corresponding to the first codeword, so as to achieve the CSI calculation of non-coherent joint transmission.

Further, when the CSI reports are reported to the network side, the priority of the CSI report corresponding to each codeword is the same. For the CSI report, the priority of any even subband CSI is higher than the priority of any odd subband CSI. When length of the CSI report is limited, the CSI of the subband with a lower priority may be discarded, thereby ensuring that the CSI of the subband with a higher priority can be reported to the network side normally.

Further, the CSI corresponding to each codeword and the validity indication information corresponding to each CSI are reported to the network side, so that the network side can learn which codeword the user terminal uses for CSI calculation, and further make corresponding adjustment according to the codeword that has effective CSI to improve performance of a communication system.

DETAILED DESCRIPTION

In the existing NR CSI protocol framework, the NR protocol merely supports closed-loop transmission solutions and open-loop/semi-open-loop transmission solutions, but does not involve in non-coherent joint transmission solutions.

In embodiments of the present disclosure, if the CSI calculation behavior is determined, based on the network configuration information received from the network side, to be performing CSI calculation based on non-coherent joint transmission, during the calculation of the CSI corresponding to the first codeword, a measurement calculation result of resources corresponding to other codewords is taken as inter-codeword interference corresponding to the first codeword, so as to achieve the CSI calculation of non-coherent joint transmission.

In order to clarify the objects, characteristics and advantages of the disclosure, embodiments of present disclosure will be described in detail in conjunction with accompanying drawings.

Figure 1:
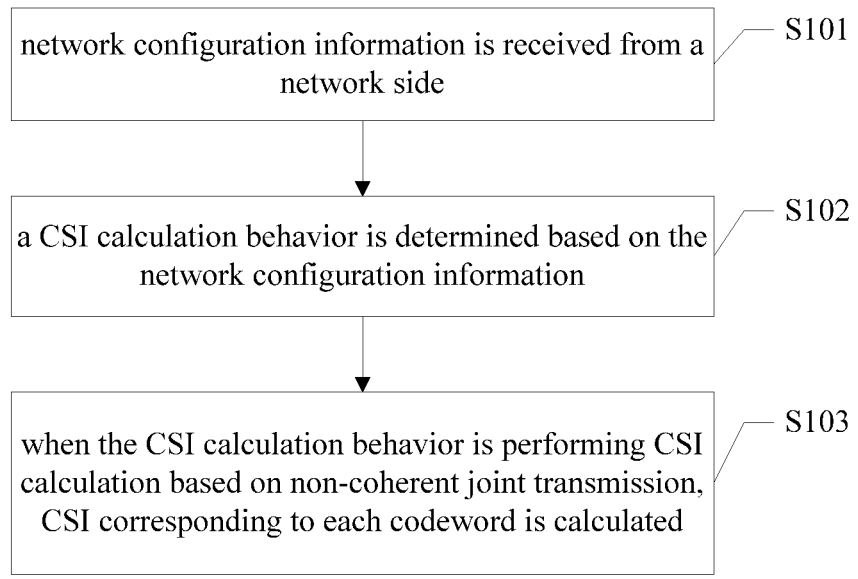
FIG. 1 is a flow chart of a CSI calculation method according to an embodiment.

FIG. 1 is a flow chart of a CSI calculation method according to an embodiment. Referring to FIG. 1, the method may include S101, S102 and S103.

In S101, network configuration information is received from a network side.

In some embodiments, when the network side needs to acquire CSI, the network side may deliver the network configuration information to the user terminal. The network configuration information delivered by the network side to the user terminal may be used to indicate the user terminal to report the CSI.

In some embodiments, the network configuration information delivered by the network side to the user terminal may include CSI report configuration information, or include CSI resource configuration information for channel measurement, or include information indicated by downlink control information.

It could be understandable that the network configuration information delivered by the network side may be other types of information, as long as it can indicate the user terminal to report the CSI, and is not limited to the aforementioned types of information.

In S102, a CSI calculation behavior is determined based on the network configuration information.

In some embodiments, the network side may set calculation behavior indication information for indicating CSI calculation behavior in the CSI report configuration information. The calculation behavior indication information set by the network side may be used to indicate whether the CSI calculation behavior is to perform CSI calculation based on incoherent joint transmission, to perform CSI calculation based on closed-loop transmission, or to perform CSI calculation based on open loop/semi-open loop transmission.

After receiving the network configuration information configured on the network side, the user terminal may learn the calculation behavior indication information configured on the network side, and then determine the CSI calculation behavior.

For example, the network side adds 1 bit of information in the CSI report configuration information to represent the calculation behavior indication information. When a value corresponding to the calculation behavior indication information is 1, it indicates the user terminal to perform CSI calculation based on incoherent joint transmission; when the value corresponding to the calculation behavior indication information is 0, it indicates the user terminal to perform CSI calculation based on other transmission solutions.

In some embodiments, the network side may indicate the CSI calculation behavior to the user terminal in the network configuration information. In practice, the CSI calculation behavior may be CSI calculation based on a closed-loop transmission solution, CSI calculation based on an open-loop/semi-open-loop transmission solution, or CSI calculation based on incoherent joint transmission.

The user terminal may determine the CSI calculation behavior after receiving the network configuration information issued by the network side.

In some embodiments, the user terminal may acquire CSI report configuration information based on the network configuration information, and determine the CSI calculation behavior based on the acquired CSI report configuration information. The CSI report configuration information may be acquired directly from the network configuration information, or indirectly based on the network configuration information.

In some embodiments, the network configuration information issued by the network side may include CSI report configuration information. Therefore, the CSI report configuration information can be acquired directly from the network configuration information issued by the network side.

In some embodiments, the network configuration information issued by the network side may include the information indicated by the downlink control information which includes a CSI aperiodic trigger state triggered to be selected by a CSI request. Therefore, the CSI report configuration information associated with the selected CSI aperiodic trigger state may be acquired.

In some embodiments, the CSI report configuration information may carry rank (RI) information. The rank information may be used to represent a number of RIs included in the CSI report, or a maximum number of RIs included in the CSI report. The CSI report is generated by the user terminal based on the CSI report configuration information.

When in the CSI report configuration information, the rank information indicates that the number of RIs included in the CSI report is 2, or indicates that the maximum number of RIs included in the CSI report is 2, the user terminal may determine that the CSI calculation behavior is to perform CSI calculation based on incoherent joint transmission.

For example, the CSI report configuration information includes rank information which is nrofRIsPerReport and used to indicate the number of RIs included in the CSI report. When nrofRIsPerReport=2, the user terminal determines that the CSI calculation behavior is to perform CSI calculation based on incoherent joint transmission.

For another example, the rank information is maxNrofRIsPerReport which is used to indicate the maximum number of RIs included in the CSI report. When maxNrofRIsPerReport=2, the user terminal determines that the CSI calculation behavior is to perform CSI calculation based on incoherent joint transmission.

In some embodiments, the user terminal may acquire CSI resource configuration information for channel measurement based on network configuration information, and determine CSI calculation behavior based on CSI resource configuration information for channel measurement. The CSI resource configuration information for channel measurement may be acquired directly from the network configuration information, or indirectly based on the network configuration information.

In some embodiments, the network configuration information delivered by the network side may include CSI resource configuration information for channel measurement. Therefore, the CSI resource configuration information for channel measurement may be directly acquired from the network configuration information issued by the network side.

In some embodiments, the network configuration information issued by the network side may include the information indicated by the downlink control information which includes the CSI aperiodic trigger state triggered to be selected by a CSI request. Therefore, CSI resource configuration information for channel measurement associated with the selected CSI aperiodic trigger state may be acquired.

In some embodiments, the network side may indicate in the CSI resource configuration information for channel measurement that a resource set includes at least two NZP CSI-RS resources. After receiving the network configuration information, the user terminal learns that the CSI resource configuration information for channel measurement indicates that a resource set includes at least two NZP CSI-RS resources. In this case, the user terminal learns that the CSI calculation behavior is to perform CSI calculation based on incoherent joint transmission.

Alternatively, the network side may indicate in the CSI resource configuration information for channel measurement that one NZP CSI-RS resource includes a plurality of port groups which have different QCL information. When receiving the network configuration information, the user terminal learns that the CSI resource configuration information for channel measurement indicates that one NZP CSI-RS resource includes at least two port groups which have different QCL information. In this case, the user terminal learns that the CSI calculation behavior is to perform CSI calculation based on incoherent joint transmission.

In some embodiments, the network configuration information issued by the network side may be information indicated based on downlink control information, and the information indicated by the downlink control information may indicate that the CSI calculation behavior of the user terminal is to perform CSI calculation based on incoherent joint transmission.

In some embodiments, the information indicated by the downlink control information is the CSI aperiodic trigger state triggered to be selected by a CSI request.

The CSI aperiodic trigger state may include 1 bit information which is used to indicate whether the CSI calculation behavior of the user terminal is based on incoherent joint transmission or other transmission solutions. The CSI aperiodic trigger state may include rank joint information which indicates whether the CSI calculation behavior of the user terminal is based on non-coherent joint transmission or other transmission solutions. The rank joint information may mean that two sets of RI values reported by the user terminal must satisfy a candidate rank pair.

In S103, when the CSI calculation behavior is performing CSI calculation based on non-coherent joint transmission, CSI corresponding to each codeword is calculated.

In non-coherent transmission, multiple codeword transmission is supported. In embodiments of the present disclosure, a codeword is an independent transmission block transmitted in a Transmission Time Interval (TTI) that contains a CRC bit and undergoes encoding and rate matching. It is stipulated in LTE that for each user terminal, a TTI can transmit at most two codewords.

It should be noted that the codewords in the embodiments of the present disclosure and the codewords in the codebook involved in practice are not the same concept.

In some embodiments, the user terminal may determine that the CSI calculation behavior is to perform CSI calculation based on incoherent joint transmission based on the CSI report configuration information configured on the network side. The resource set for channel measurement may include multiple NZP CSI-RS resources for channel measurement, or may include merely one NZP CSI-RS resource for channel measurement. When the resource set includes multiple NZP CSI-RS resources for channel measurement, different codewords may correspond to different NZP CSI-RS resources; and when the resource set includes merely one NZP CSI-RS resource for channel measurement, the NZP CSI-RS resource may include multiple port groups, and different codewords may correspond to different port groups.

Therefore, when calculating CSI corresponding to a first codeword, the user terminal may take a measurement and calculation result of the NZP CSI-RS resources corresponding to other codewords as inter-codeword interference, or take a measurement and calculation result of port groups corresponding to other codewords in the same NZP CSI-RS resource as the inter-codeword interference.

For example, a resource for channel measurement corresponding to codeword 1 and a resource for channel measurement corresponding to codeword 2 belong to a same resource set. In calculation of CSI corresponding to the codeword 1, a measurement and calculation result of the resource corresponding to the codeword 2 may be taken as the inter-codeword interference corresponding to the codeword 1.

In some embodiments, the user terminal may determine that the CSI calculation behavior is to perform CSI calculation based on incoherent joint transmission based on the CSI resource configuration information for channel measurement configured on the network side.

If the CSI resource configuration information indicates that a resource set includes at least two NZP CSI-RS resources, when calculating the CSI corresponding to the first codeword, the user terminal may take the measurement and calculation result of the NZP CSI-RS resources corresponding to other codewords as the inter-codeword interference corresponding to the first codeword. If the CSI resource configuration information indicates that one NZP CSI-RS resource includes a plurality of port groups with different QCL information, when calculating the CSI corresponding to the first codeword, the user terminal may take a measurement and calculation result of the port groups of the NZP CSI-RS resources corresponding to other codewords as the inter-codeword interference corresponding to the first codeword.

In some embodiments, the user terminal may determine that the CSI calculation behavior is to perform CSI calculation based on non-coherent joint transmission based on the information indicated by the downlink control information configured on the network side. When calculating the CSI corresponding to the first codeword, the user terminal takes a measurement and calculation result of other codewords in the same CSI aperiodic trigger state as the inter-codeword interference corresponding to the first codeword. The measurement and calculation result of the other codewords includes: a measurement and calculation result of NZP CSI-RS resources in a resource set for channel measurement in configuration information associated with the other codewords.

In some embodiments, the measurement and calculation result of resources corresponding to other codewords may be taken as the inter-codeword interference corresponding to the first codeword.

In some embodiments, after calculating the CSI corresponding to each codeword, the user terminal may further report the calculated CSI corresponding to each codeword to the network side.

In some embodiments, the user terminal may report a CSI report to the network side when reporting the CSI corresponding to each codeword to the network side. The CSI report carries the CSI corresponding to all codewords.

For example, after calculating the CSI corresponding to codeword 1 and the CSI corresponding to codeword 2, the user terminal includes the CSI corresponding to codeword 1 and the CSI corresponding to codeword 2 in a CSI report, and transmits the CSI report to the network side.

In some embodiments, the user terminal may report a plurality of CSI reports to the network side, and each CSI report may carry the CSI corresponding to a codeword.

For example, the user terminal may report two CSI reports to the network side, where one CSI report carries the CSI corresponding to codeword 1, and the other CSI report carries the CSI corresponding to codeword 2.

In some embodiments, when different CSI reports are adopted to carry CSI corresponding to different codewords, in CSI priority processing, priorities corresponding to different CSI reports may be equal. For the CSI report corresponding to each codeword, a priority of any even subband CSI is higher than a priority of any odd subband CSI in the CSI report corresponding to any codeword.

For example, the user terminal transmits CSI corresponding to two codewords to the network side. The priority of any even subband CSI in the CSI report corresponding to codeword 1 is higher than the priority of any odd subband CSI in the CSI reports corresponding to codeword 1 and codeword 2.

In some embodiments, the CSI corresponding to two codewords may be the same. If the CSI report corresponding to the first codeword is the same as the CSI report corresponding to the second codeword, and any CSI report includes any one of CRI, RI, PMI or CQI, it indicates that in calculation of the CSI of the first codeword, a measurement and calculation result corresponding to the second codeword is not taken as the inter-codeword interference of the first codeword.

For example, the user terminal reports CSI reports corresponding to two codewords, where one of the CSI reports includes CRI, RI and CQI, and the CSI reports corresponding to the two codewords are the same. In this case, it is determined that in calculation of CSI of codeword 1, a measurement and calculation result corresponding to codeword 2 is not taken as the inter-codeword interference of codeword 1.

In some embodiments, when reporting the CSI report to the network side, the user terminal may further add information for indicating validity of the CSI into the CSI report. In some embodiments, the user terminal may add 1 bit or 2 bits to the CSI report to indicate the validity of the CSI. The number of bits added in the CSI report may be equal to the number of codewords used.

When a CSI report merely carries CSI corresponding to one codeword, the user terminal may add 1 bit of validity information to the CSI report to indicate the validity of the CSI corresponding to the current codeword.

For example, when a value of the newly added 1 bit in the CSI report is 1, it indicates that the CSI corresponding to the codeword is valid; otherwise, when the value of the newly added 1 bit in the CSI report is 0, it indicates that the CSI corresponding to the codeword is invalid.

When a CSI report carries CSI corresponding to two codewords, the user terminal may add 2 bits to the CSI report to indicate the validity of the CSI corresponding to codeword 1 and the validity of the CSI corresponding to codeword 2.

For example, when the value of the newly added 2 bits in the CSI report is 01, it indicates that the CSI corresponding to codeword 1 is invalid, and the CSI corresponding to codeword 2 is valid.

When an RI in a CSI report is greater than 4, the CSI report is considered to be invalid.

For example, the user terminal reports two CSI reports, and the value of RI in the CSI report corresponding to codeword 2 is greater than 4. It is determined that the CSI corresponding to codeword 2 is meaningless. In calculation of the CSI corresponding to codeword 1, it is unnecessary to take a measurement and calculation result corresponding to codeword 2 as inter-codeword interference of codeword 1. Therefore, when transmitting the CSI corresponding to each codeword to the network side, the user terminal also transmits the CSI validity information to the network side to represent that the CSI corresponding to codeword 2 is invalid and the CSI corresponding to codeword 1 is valid.

In practice, the user terminal may not need to transmit information about the validity of the CSI to the network side. When learning that an RI in a CSI report is greater than 4, the network side learns that the CSI report is invalid.

The user terminal reports the validity indication information corresponding to each CSI to the network side, so that the network side knows CSI corresponding to which codeword is valid and CSI corresponding to which codeword is invalid, based on which transmission solutions can be adjusted accordingly, thereby improving performance of a communication system.

In some embodiments, if the network configuration information issued by the network side is based on the information indicated by the downlink control information, and different codewords correspond to different downlink control information, a value of the CSI requests in the different downlink control information is the same.

In some embodiments, when it is detected that the validity indication information corresponding to the CSI corresponding to the second codeword indicates invalid, it is determined that in calculation of the CSI corresponding to the first codeword, a measurement and calculation result corresponding to the second codeword is not taken as the inter-codeword interference of the first codeword.

Figure 2:
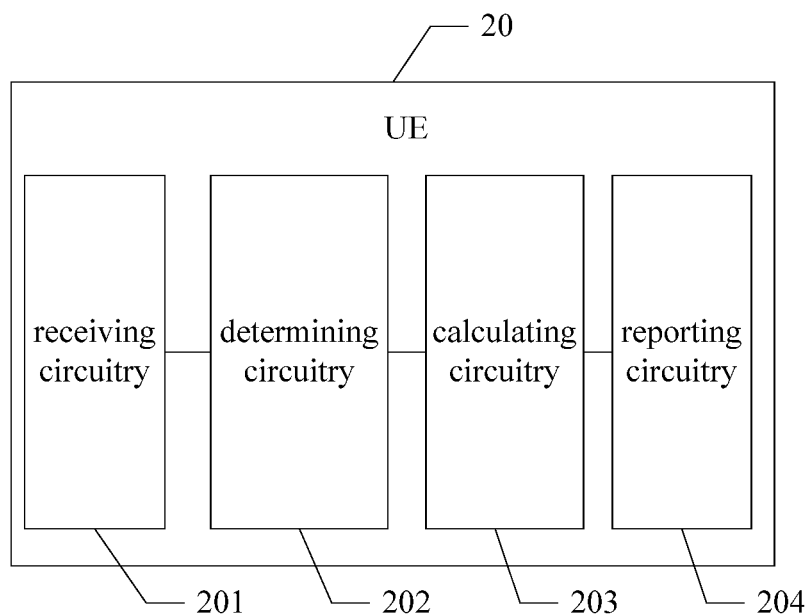
FIG. 2 is a structural diagram of a user terminal according to an embodiment.

Referring to FIG. 2, an embodiment of the present disclosure further provides a user terminal 20 including a receiving circuitry 201, a determining circuitry 202 and a calculating circuitry 203.

The receiving circuitry 201 is configured to receive network configuration information from a network side. The determining circuitry 202 is configured to determine a CSI calculation behavior based on the network configuration information. The calculating circuitry 203 is configured to: if the CSI calculation behavior is to perform CSI calculation based on non-coherent joint transmission, calculate CSI corresponding to each codeword, wherein when calculating the CSI corresponding to a first codeword, a measurement calculation result of resources corresponding to other codewords is taken as inter-codeword interference corresponding to the first codeword.

In some embodiments, the determining circuitry 202 is configured to determine the CSI calculation behavior based on the network configuration information in any one of the following ways: acquiring CSI report configuration information based on the network configuration information, and determining the CSI calculation behavior based on the CSI report configuration information; or, acquiring CSI resource configuration information for channel measurement based on the network configuration information, and determining the CSI calculation behavior based on the CSI resource configuration information for channel measurement; or, acquiring indication information for indicating the CSI calculation behavior based on the network configuration information, and determining the CSI calculation behavior based on the indication information for indicating the CSI calculation behavior.

In some embodiments, the determining circuitry 202 is configured to acquire the CSI report configuration information based on the network configuration information in any one of the following ways: acquiring the CSI report configuration information from the network configuration information; or acquiring information indicated by downlink control information from the network configuration information, wherein the information indicated by the downlink control information includes a CSI aperiodic trigger state triggered to be selected by a CSI request; and acquiring the CSI report configuration information associated with the CSI aperiodic trigger state.

In some embodiments, the determining circuitry 202 is configured to: acquire rank information from the CSI report configuration information, wherein the rank information indicates a number of ranks included in a CSI report, or a maximum number of ranks included in the CSI report; and if the rank information indicates that the number of ranks included in the CSI report is 2, or indicates that the maximum number of ranks included in the CSI report is 2, determine that the CSI calculation behavior is to perform CSI calculation based on non-coherent joint transmission.

In some embodiments, the calculating circuitry 203 is configured to: if a resource set includes a plurality of NZP CSI-RS resources, take a measurement and calculation result of NZP CSI-RS resources corresponding to other codewords as the inter-codeword interference corresponding to the first codeword, and calculate the CSI corresponding to the first codeword based on the inter-codeword interference corresponding to the first codeword; or if the resource set includes one NZP CSI-RS resource which includes port groups with different QCL information, take a measurement and calculation result of port groups corresponding to other codewords as the inter-codeword interference corresponding to the first codeword, and calculate the CSI corresponding to the first codeword based on the inter-codeword interference corresponding to the first codeword.

In some embodiments, the determining circuitry 202 is configured to acquire CSI resource configuration information for channel measurement based on the network configuration information in any one of the following ways: acquiring the CSI resource configuration information for channel measurement from the network configuration information; or acquiring information indicated by downlink control information from the network configuration information, wherein the information indicated by the downlink control information includes a CSI aperiodic trigger state triggered to be selected by a CSI request; and acquiring the CSI resource configuration information for channel measurement associated with the CSI aperiodic trigger state.

In some embodiments, the determining circuitry 202 is configured to: if it is learned that in the CSI resource configuration information for channel measurement, one resource set includes at least two NZP CSI-RS resources, determine that the CSI calculation behavior is to perform CSI calculation based on non-coherent joint transmission.

In some embodiments, the calculating circuitry 203 is configured to: take a measurement and calculation result of NZP CSI-RS resources corresponding to other codewords as the inter-codeword interference corresponding to the first codeword, and calculate the CSI corresponding to the first codeword based on the inter-codeword interference corresponding to the first codeword.

In some embodiments, the determining circuitry 202 is configured to: if it is learned that in the CSI resource configuration information for channel measurement, one NZP CSI-RS resource has at least two port groups which correspond to different QCL information, determine that the CSI calculation behavior is to perform CSI calculation based on non-coherent joint transmission.

In some embodiments, the calculating circuitry 203 is configured to: take a measurement and calculation result of port groups corresponding to other codewords as the inter-codeword interference corresponding to the first codeword, and calculate the CSI corresponding to the first codeword based on the inter-codeword interference corresponding to the first codeword.

In some embodiments, the determining circuitry 202 is configured to: acquire information indicated by downlink control information from the network configuration information; and acquire the indication information for indicating the CSI calculation behavior which is included in a CSI aperiodic trigger state based on the information indicated by the downlink control information.

In some embodiments, the indication information for indicating the CSI calculation behavior is rank joint information, and the rank joint information means that different rank values reported satisfy a candidate rank pair.

In some embodiments, the calculating circuitry 203 is configured to: take a measurement and calculation result corresponding to other codewords in the same CSI aperiodic trigger state as the inter-codeword interference corresponding to the first codeword, and calculate the CSI corresponding to the first codeword based on the inter-codeword interference corresponding to the first codeword, wherein the measurement and calculation result corresponding to other codewords includes a measurement and calculation result of NZP CSI-RS resources in a resource set for channel measurement in configuration information associated with the other codewords.

In some embodiments, when the network configuration information includes information indicated by a plurality of downlink control information, values corresponding to CSI requests in the plurality of downlink control information are equal.

In some embodiments, the user terminal 20 further includes a reporting circuitry 204 configured to: after the calculating circuitry 203 calculates the CSI corresponding to each codeword, report the CSI corresponding to each codeword to the network side.

In some embodiments, the reporting circuitry 204 is configured to report the CSI corresponding to each codeword and validity indication information corresponding to each CSI to the network side.

In some embodiments, the validity indication information has a length of 1 bit or 2 bits.

In some embodiments, the reporting circuitry 204 is configured to report the CSI corresponding to each codeword to the network side in any of the following ways: reporting a CSI report to the network side, wherein the CSI report carries the CSI corresponding to each codeword; or reporting a plurality of CSI reports to the network side, wherein each of the plurality of CSI reports carries CSI corresponding to one codeword.

In some embodiments, when each of the plurality of CSI reports carries the CSI corresponding to one codeword, a priority of the CSI report corresponding to each codeword is the same, and a priority of any even subband CSI in the CSI report corresponding to each codeword is higher than a priority of any odd subband CSI in the CSI reports corresponding to all codewords.

In an embodiment of the present disclosure, a nonvalatile or nontransitory computer readable storage medium having computer instructions stored therein is provided, wherein when the computer instructions are executed, any one of the above methods is performed.

In an embodiment of the present disclosure, a user terminal including a memory and a processor is provided, wherein the memory has computer instructions stored therein, and when the processor executes the computer instructions, any one of the above methods is performed.

Those skilled in the a could understand that all or parts of the steps in the various methods of the above-mentioned embodiments may be completed by a program instructing relevant hardware, and the program may be stored in any computer-readable storage medium. The storage medium may include a Read Only Memory (ROM), a Random Access Memory (RAM), a magnetic disk or an optical disk.

Although the present disclosure has been disclosed above with reference to preferred embodiments thereof, it should be understood that the disclosure is presented by way of example only, and not limitation. Those skilled in the art can modify and vary the embodiments without departing from the spirit and scope of the present disclosure.

What is claimed is:

1. A Channel State Information (CSI) calculation method, comprising:
  receiving network configuration information from a network side;
  determining a CSI calculation behavior based on the network configuration information; and
  based on that the CSI calculation behavior is to perform CSI calculation based on non-coherent joint transmission, calculating CSI corresponding to each codeword, wherein when calculating the CSI corresponding to a first codeword, a measurement calculation result of resources corresponding to other codewords is taken as inter-codeword interference corresponding to the first codeword,
  wherein determining the CSI calculation behavior based on the network configuration information comprises any one of the following:
    acquiring CSI resource configuration information for channel measurement based on the network configuration information, and determining the CSI calculation behavior based on the CSI resource configuration information for channel measurement; or
    acquiring indication information for indicating the CSI calculation behavior based on the network configuration information, and determining the CSI calculation behavior based on the indication information for indicating the CSI calculation behavior;
  wherein based on detecting that RI of CSI corresponding to a second codeword is greater than 4, in calculation of the CSI corresponding to the first codeword, a measurement and calculation result corresponding to the second codeword is not taken as the inter-codeword interference corresponding to the first codeword.

2. The CSI calculation method according to claim 1, wherein acquiring CSI resource configuration information for channel measurement based on the network configuration information comprises any one of the following:
  acquiring the CSI resource configuration information for channel measurement from the network configuration information; or
  acquiring information indicated by downlink control information from the network configuration information, wherein the information indicated by the downlink control information comprises a CSI aperiodic trigger state triggered to be selected by a CSI request; and acquiring the CSI resource configuration information for channel measurement associated with the CSI aperiodic trigger state.

3. The CSI calculation method according to claim 2, wherein determining the CSI calculation behavior based on the CSI resource configuration information for channel measurement comprises:
  based on it being learned that in the CSI resource configuration information for channel measurement, one resource set comprises at least two NZP CSI-RS resources, determining that the CSI calculation behavior is to perform CSI calculation based on non-coherent joint transmission.

4. The CSI calculation method according to claim 3, wherein calculating the CSI corresponding to the first codeword comprises:
  taking a measurement and calculation result of NZP CSI-RS resources corresponding to other codewords as the inter-codeword interference corresponding to the first codeword, and calculating the CSI corresponding to the first codeword based on the inter-codeword interference corresponding to the first codeword.

5. The CSI calculation method according to claim 2, wherein determining the CSI calculation behavior based on the CSI resource configuration information for channel measurement comprises:

based on it being learned that in the CSI resource configuration information for channel measurement, one NZP CSI-RS resource has at least two port groups which correspond to different QCL information, determining that the CSI calculation behavior is to perform CSI calculation based on non-coherent joint transmission.

6. The CSI calculation method according to claim 5, wherein calculating the CSI corresponding to the first codeword comprises:
taking a measurement and calculation result of port groups corresponding to other codewords as the inter-codeword interference corresponding to the first codeword, and calculating the CSI corresponding to the first codeword based on the inter-codeword interference corresponding to the first codeword.

7. The CSI calculation method according to claim 1, wherein acquiring indication information for indicating the CSI calculation behavior based on the network configuration information comprises:
acquiring information indicated by downlink control information from the network configuration information; and
acquiring the indication information for indicating the CSI calculation behavior which is included in a CSI aperiodic trigger state based on the information indicated by the downlink control information.

8. The CSI calculation method according to claim 7, wherein calculating the corresponding to the first codeword comprises:
taking a measurement and calculation result corresponding to other codewords in the same CSI aperiodic trigger state as the inter-codeword interference corresponding to the first codeword, and calculating the CSI corresponding to the first codeword based on the inter-codeword interference corresponding to the first codeword, wherein the measurement and calculation result corresponding to other codewords comprises a measurement and calculation result of NZP CSI-RS resources in a resource set for channel measurement in configuration information associated with the other codewords.

9. The CSI calculation method according to claim 1, wherein after calculating the CSI corresponding to each codeword, the method further comprises:
reporting the CSI corresponding to each codeword to the network side.

10. The CSI calculation method according to claim 9, wherein reporting the CSI corresponding to each codeword to the network side comprises:
reporting the CSI corresponding to each codeword and validity indication information corresponding to each CSI to the network side.

11. The CSI calculation method according to claim 9, wherein based on detecting that the validity indication information corresponding to the CSI corresponding to a second codeword indicates invalid, in the calculation of the CSI corresponding to the first codeword, a measurement and calculation result corresponding to the second codeword is not taken as the inter-codeword interference corresponding to the first codeword.

12. The CSI calculation method according to claim 9, wherein the CSI corresponding to each codeword is reported to the network side in any of the following ways:
reporting a CSI report to the network side, wherein the CSI report carries the CSI corresponding to each codeword; or reporting a plurality of CSI reports to the network side, wherein each of the plurality of CSI reports carries CSI corresponding to one codeword.

13. The CSI calculation method according to claim 12, wherein based on that each of the plurality of CSI reports carries the CSI corresponding to one codeword, a priority of the CSI report corresponding to each codeword is the same, and a priority of any even subband CSI in the CSI report corresponding to each codeword is higher than a priority of any odd subband CSI in the CSI reports corresponding to all codewords.

14. The CSI calculation method according to claim 1, wherein when the CSI corresponding to the first codeword is the same as CSI corresponding to a second codeword, and the CSI corresponding to the first codeword comprises at least one of CRI, RI, PMI or CQI, in calculation of the CSI corresponding to the first codeword, a measurement and calculation result corresponding to the second codeword is not taken as the inter-codeword interference corresponding to the first codeword.

15. A non-volatile or non-transitory computer readable storage medium storing one or more programs, the one or more programs comprising computer instructions, which, when executed by a processor, cause the processor to:
receive network configuration information from a network side;
determine a CSI calculation behavior based on the network configuration information; and
based on that the CSI calculation behavior is to perform CSI calculation based on non-coherent joint transmission, calculate CSI corresponding to each codeword, wherein when calculating the CSI corresponding to a first codeword, a measurement calculation result of resources corresponding to other codewords is taken as inter-codeword interference corresponding to the first codeword;
wherein said determining the CSI calculation behavior based on the network configuration information comprises any one of the following:
acquiring CSI resource configuration information for channel measurement based on the network configuration information, and determining the CSI calculation behavior based on the CSI resource configuration information for channel measurement; or
acquiring indication information for indicating the CSI calculation behavior based on the network configuration information, and determining the CSI calculation behavior based on the indication information for indicating the CSI calculation behavior;
wherein based on detecting that RI of CSI corresponding to a second codeword is greater than 4, in calculation of the CSI corresponding to the first codeword, a measurement and calculation result corresponding to the second codeword is not taken as the inter-codeword interference corresponding to the first codeword.

16. A user terminal comprising a memory and a processor, wherein the memory stores one or more programs, the one or more programs comprising computer instructions, which, when executed by the processor, cause the processor to:
receive network configuration information from a network side;
determine a CSI calculation behavior based on the network configuration information; and
based on that the CSI calculation behavior is to perform CSI calculation based on non-coherent joint transmission, calculate CSI corresponding to each codeword, wherein when calculating the CSI corresponding to a first codeword, a measurement calculation result of resources corresponding to other codewords is taken as inter-codeword interference corresponding to the first codeword;

wherein said determining the CSI calculation behavior based on the network configuration information comprises any one of the following:

acquiring CSI resource configuration information for channel measurement based on the network configuration information, and determining the CSI calculation behavior based on the CSI resource configuration information for channel measurement; or acquiring indication information for indicating the CSI calculation behavior based on the network configuration information, and determining the CSI calculation behavior based on the indication information for indicating the CSI calculation behavior;

wherein based on detecting that RI of CSI corresponding to a second codeword is greater than 4, in calculation of the CSI corresponding to the first codeword, a measurement and calculation result corresponding to the second codeword is not taken as the inter-codeword interference corresponding to the first codeword.

* * * * *